July 12, 1938. E. C. WHIPPLE 2,123,759
APPARATUS FOR CLEANING EGGS
Filed June 11, 1936
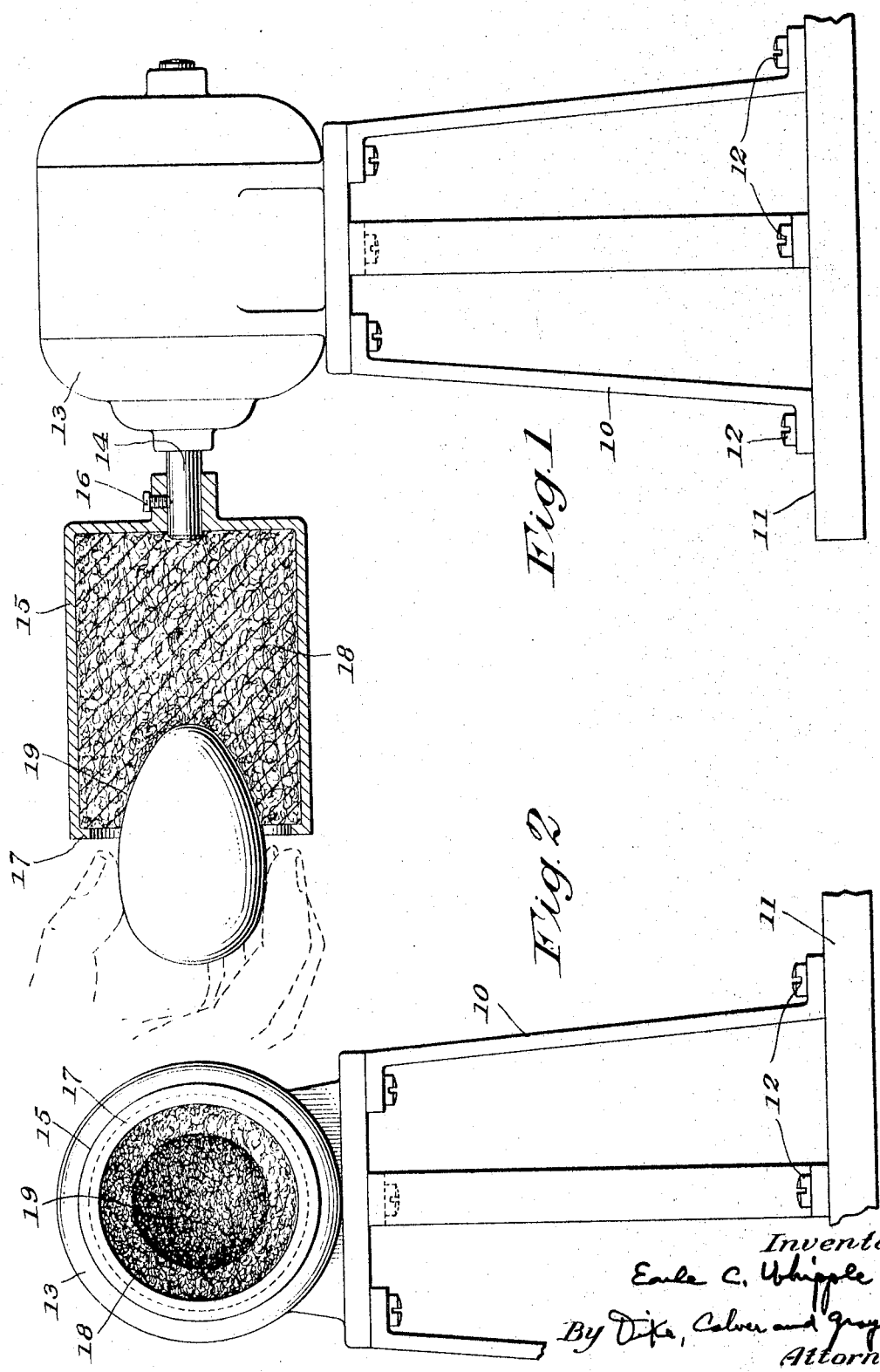

Patented July 12, 1938

2,123,759

UNITED STATES PATENT OFFICE 2,123,759

APPARATUS FOR CLEANING EGGS

Earle C. Whipple, Goffstown, N. H.

Application June 11, 1936, Serial No. 84,668

1 Claim. (Cl. 15—93)

The cleaning of eggs in their preparation for the market is a delicate procedure because of the fragile nature of the article. Various methods have been proposed but many of these methods have involved the use of liquids. Poultry authorities have discouraged the use of liquids, even water. Other methods proposed have involved the use of complicated and expensive apparatus which has resulted in high percentage of breakage.

It is an object of the present invention to provide an apparatus whereby eggs may be cleaned easily and quickly.

It is a further object to provide an apparatus for effectively cleaning eggs with less danger of breakage than has heretofore been possible and without the use of liquids.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention will be more clearly understood from the following description in conjunction with the accompanying drawing, in which, Fig. 1 is a side elevational view, partly in section, of an apparatus embodying the invention, and Fig. 2 is an end elevational view of the same.

The embodiment of the invention illustrated in the accompanying drawing comprises a support 10 suitably fixed upon a floor or other foundation 11 by screws 12. The support 10 carries an electric motor 13 upon the armature shaft 14 of which a receptacle 15 is suitably fixed by a screw 16. Preferably, the container 15 is a hard fiber container of hollow cylindrical form having one end open and provided with an inwardly extending lip 17. Within the container 15 is suitably arranged a relatively compact yet resilient mass 18 of steel wool. It will be understood, however, that other material having similar characteristics and properties may be substituted for the steel wool. Mass of steel wool 18 adjacent the open end of the container 15 preferably is provided with a recess 19 of such shape and size as to be adapted to engage substantially one-half the surface of an egg when the latter is inserted endwise therein through the open end of the receptacle.

In the operation of the apparatus, power is supplied to the motor to rotate the armature shaft 14 and the receptacle 15, thus causing rotation of the mass of steel wool 18 about an extension of the axis of the armature shaft 14. One end of an egg is then inserted through the open end of the container 15 and into the recess 19 to permit the steel wool to clean the surface of the egg in engagement therewith. The egg is then removed and the opposite end inserted into the recess 19 and cleaned in a similar manner. It will be understood that the shape and size of the recess 19 and the resiliency of the mass of steel wool is such as to permit at least one-half the surface of the egg to be engaged by the steel wool. The resiliency of the mass of steel wool also is such as to permit it to conform with any irregularities in the shape of the ends of eggs to effectively clean the same and at the same time not exert such a pressure upon the shell of the egg as to cause breakage. Preferably the depth of the steel wool mass is made much greater than half the major axis of the egg, i. e., is made greater than the length of the egg as shown in Figure 1 so that any pressure of the egg against the mass of steel wool can be taken up by the resilient bulk of material behind the egg.

An apparatus of the general character described has been found suitable for cleaning eggs in the course of their preparation for the market and is of such a character that the eggs may be subjected to the cleaning operation without special care of the operator to prevent breakage. It also effects satisfactory cleaning of the eggs without the use if any liquids whatsoever, an expedient which has been used heretofore and which has been discouraged by poultry authorities.

What I claim is:

An apparatus for cleaning eggs comprising a rotatable hollow elongated cylinder, the length of said cylinder being much greater than one half the major axis of an average hen's egg, one end of said cylinder being closed, means connected to said closed end for rotating the cylinder about its axis, the opposite end of said cylinder having an opening slightly greater in diameter than the minor axis of the egg, a resilient mass of steel wool positioned in said cylinder from end to end thereof, said mass having a recess at one end in registration with said opening, said recess being of hemi-ellipsoidal shape conforming, in general, to the hemi-ellipsoidal surface of the egg to provide an abrading surface of such dimensions as to receive at least one half of an egg, the depth of the steel wool mass behind the recess being such as not to exert such a pressure upon the shell of the egg when the same is pressed thereagainst as to cause breakage thereof and the contour of the abrading surface being such as to react substantially at right angles to the engaging surface of an egg pressed thereagainst during the operation of the apparatus whereby effectively to clean the egg, without breakage thereof, irrespectively of any variation in its contour.

EARLE C. WHIPPLE.